United States Patent [19]

Mizobe et al.

[11] Patent Number: 5,721,660
[45] Date of Patent: Feb. 24, 1998

[54] WIRING STRUCTURE FOR REDUCING TRANSIENT IMPEDANCE

[76] Inventors: Kunitaka Mizobe, 2-31-38, Hoshikuma Jyonann-ku, Fukuoka-shi, Fukuoka; Shohei Kato, 3-21-11, Kawaturu, Kawagoe-shi, both of Japan

[21] Appl. No.: 640,773

[22] PCT Filed: Nov. 2, 1994

[86] PCT No.: PCT/JP94/01850

§ 371 Date: May 2, 1996

§ 102(e) Date: May 2, 1996

[87] PCT Pub. No.: WO95/12910

PCT Pub. Date: May 11, 1995

[30] Foreign Application Priority Data

Nov. 2, 1993 [JP] Japan ................................. 5-297520

[51] Int. Cl.$^6$ ........................................................ H02H 3/22
[52] U.S. Cl. .................................................. 361/111; 361/91
[58] Field of Search ............................ 361/111, 56, 91; 307/89–91

[56] References Cited

U.S. PATENT DOCUMENTS 1,651,449  4/1927  Evans ................................. 307/90

Primary Examiner—Jeffrey A. Gaffin
Assistant Examiner—Sally C. Medley
Attorney, Agent, or Firm—Flynn, Thiel, Boutell & Tanis, P.C.

[57] ABSTRACT

A wiring structure for reducing a transient impedance in an electric current path by means of a simple work and an execution method. The structure comprises a first electric current path (1) having an entry point (o) of surge and a branch point (a) on a side opposite to the entry point of surge, a second electric current path (3) having both terminal ends (d, e) where reflected waves are caused by surge and connection points (b, c) which are respectively spaced distance ($d_2$) from the both terminal ends (d, e) and branch electric current paths (2) of substantially the same length for connecting the branch point (a) to the both terminal ends (d, e).

10 Claims, 10 Drawing Sheets

THE SURGE IMPEDANCE OF bd IS SHOWN

WHEN THERE IS NO b-c INTERVAL $d_1 = 2d_2$ $d_1 < 2d_2$

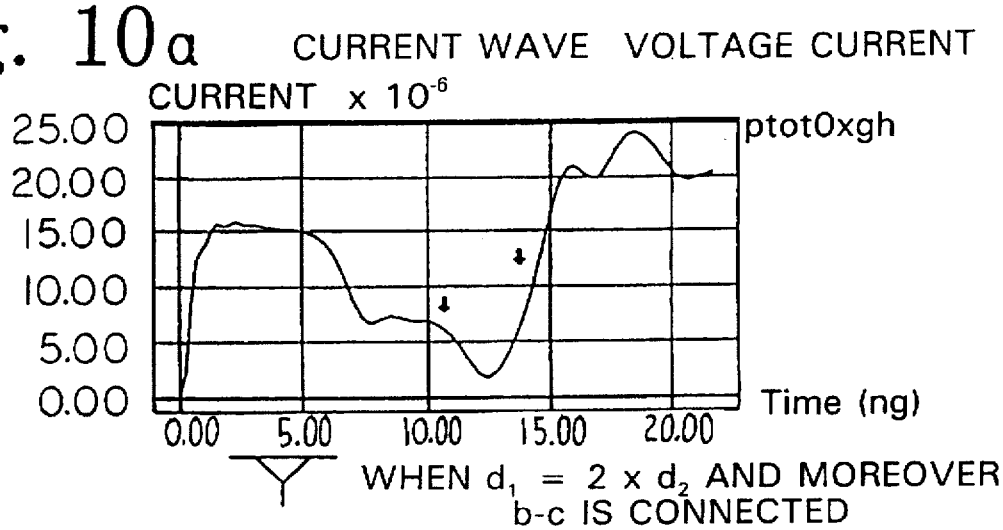
Fig. 10a — Current wave voltage current. When $d_1 = 2 \times d_2$ and moreover b-c is connected.
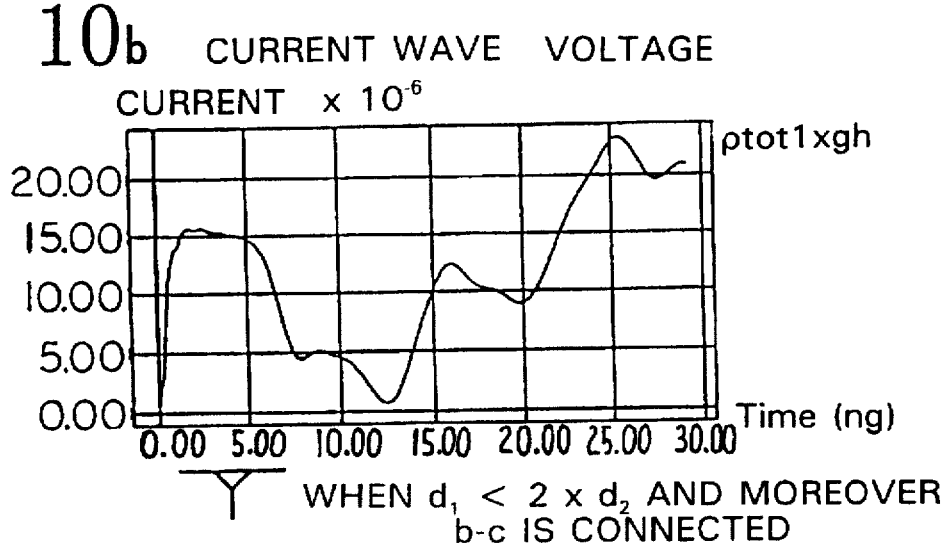
Fig. 10b — Current wave voltage. When $d_1 < 2 \times d_2$ and moreover b-c is connected.
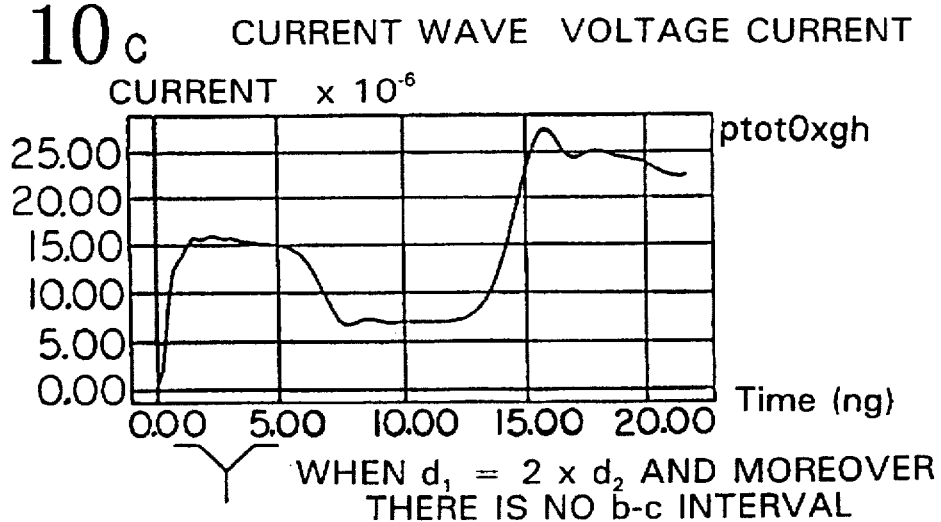
Fig. 10c — Current wave voltage current. When $d_1 = 2 \times d_2$ and moreover there is no b-c interval.

Fig. 12
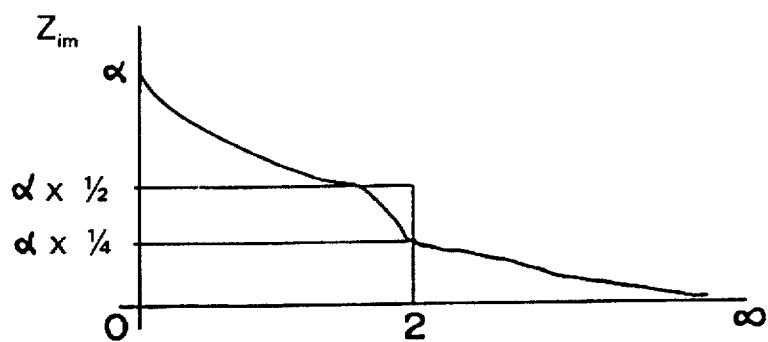
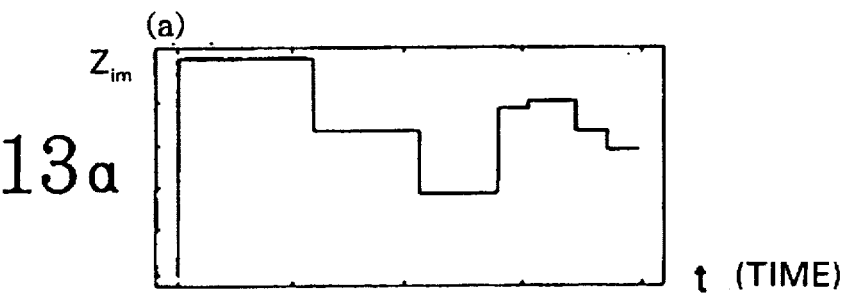
Fig. 13a
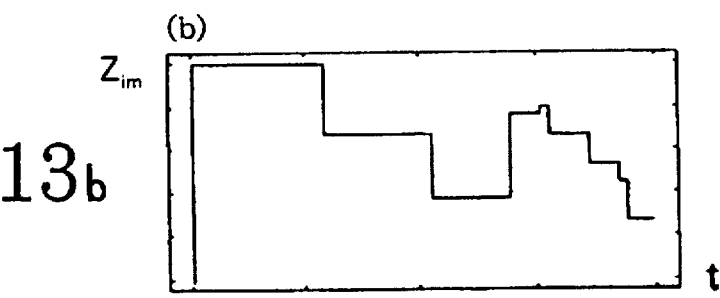
Fig. 13b
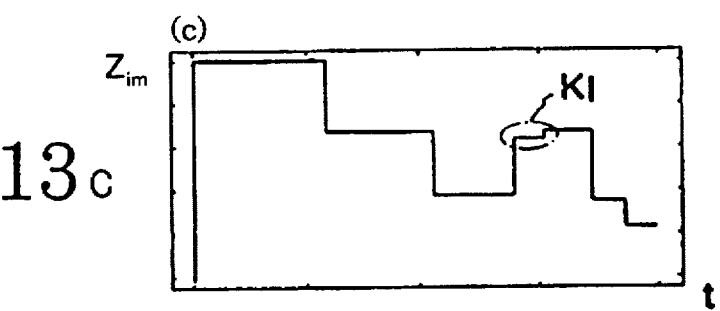
Fig. 13c
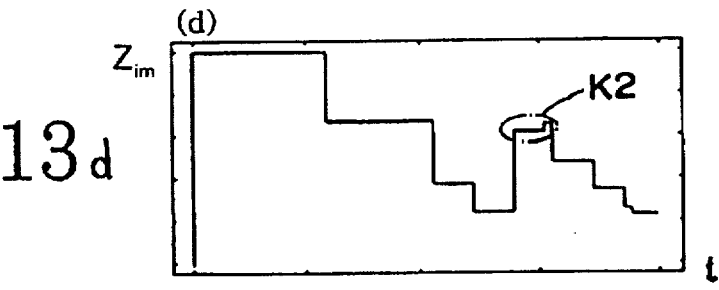
Fig. 13d

WIRING STRUCTURE FOR REDUCING TRANSIENT IMPEDANCE

FIELD OF THE INVENTION

The present invention relates to a wiring structure for reducing transient impedance, which is suitable for reducing transient impedance (surge impedance) for an electric current path without using any special device, and which in particular can reduce the transient impedance for an electric current path just by the provision of a simple wiring structure.

BACKGROUND ART

In the prior art, even with circuitry and grounding wiring which are influenced by transient impedance, a first electric current path has been simply abutted against a second electric current path in the shape of a letter T.

Further, with grounding wiring, a buried so called counterpoise long wire has been provided.

In cases like these, in extremity, a method to make for example the grounding transient impedance small has been to cover the earth with an extended conductor (a copper plate or the like); but, since there are problems of difficulty and increase of cost and so on with carrying out this method, the earth has been constructed with a conductor which is restricted to mesh or the like.

In this case, although the basis of reducing the transient impedance is to determine the electric current path as seen from the electric current input point so as to make it as large as possible, nevertheless it is desirable to be able to realize a low transient impedance using as small a quantity of conductor as possible, since there are problems with regard to the manner in which the work is to be performed, and with regard to the amount of conductor required.

However, with this prior art type of circuitry or grounding wiring, it is not possible to reduce the transient impedance, and, in order to reduce the transient impedance with this type of wiring structure, problems have arisen of the type described above with respect to increase of cost and the like.

Accordingly, the present invention has as its object to propose a wiring structure which can reduce the transient impedance, without entailing any of the faulty points of the prior art wiring structures, and further with a simple structure and at a low cost.

DISCLOSURE OF THE INVENTION

The present invention comprises: a first electric current path comprising a surge input point (o) and a branch point (a) on the reflected current side of said surge input point; a second electric current path comprising two terminal end points (d) and (e) at which reflected waves due to surge are generated, and connection points (b) and (c) in positions each a distance ($d_2$) from both said two terminal end points (d) and (e); and branch electric current paths of substantially the same length which connect said branch point (a) and both the connection points (b) and (c). According to this construction, it is possible to anticipate an effective lowering of the transient impedance, while using an extremely simple structure, and moreover by adding a wiring structure of the minimum required limit. Although it is known that the effectiveness of reduction of the transient impedance is increased by making the apertures of a mesh smaller, the most distinguished feature of the present invention is that the maximum beneficial effect is increased, even by adding the required minimum limit of wiring structure to an already existing electric current circuit. Further, the present invention is very economical, because no special device or the like is required.

Further, in the present invention, instead of the surge current input point (o) of the first electric current path, one of the terminal ends (d) and (e) of the second electric current path may be used as the surge current input point.

According to this concept, the range of application can be extended with an extremely simple structure, and it is possible to obtain various forms of application.

Further, in the present invention, when the electric current paths are calculated as though without loss, the distance ($d_1$) between the connection points (b) and (c) may be twice the distance ($d_2$). According to this concept, it is possible to perform effective reduction of the transient impedance extremely simply and with a very economical structure.

Further, in the present invention, the branch electric current paths which connect the branch point (a) via the connection points (b) and (c) to the second electric current path may be formed in arc shapes. According to this concept, it is possible to perform the most efficient reduction of the transient impedance with an extremely simple structure.

BRIEF DESCRIPTION OF THE DRAWINGS

FIGS. 10(a), 10(b) and 10(c) are explanatory graphs for theoretical explanation, showing experimental data relating to differences of ratio between $d_1$ and $d_2$.

FIG. 12 is a figure showing the linked data from FIG. 11.

FIGS. 13(a), 13(b), 13(c) and 13(d) are graphs for theoretical explanation, in which the electric current path is calculated as though without loss.

DETAILED DESCRIPTION OF PREFERRED EMBODIMENTS

The embodiments of the present invention will now be explained based upon the figures.

First, certain conclusions which the present inventors have reached as a result of experiment will be theoretically explained.

Figure 9:
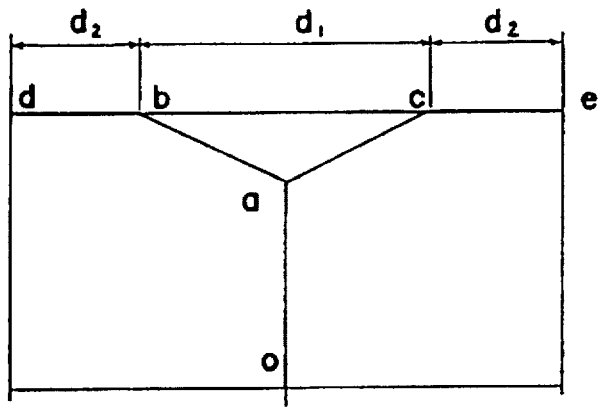
FIG. 9 is a basic structural figure for theoretical explanation, showing a first electric current path and a second electric current path.

Referring to FIG. 9, the point o is a surge entry point of a first electric current path, a is a branch point, b and c are connection points to a second electric current path, and d and e are terminal ends at which reflected waves due to surge are generated. However, d and e here are expressions used for connection points of two or more electric current paths of which the surge impedance is different at the terminal ends.

Surge which has entered at the point o is separated at the point a, and about half of the transient impedance appears at the point o. Further, surge which has arrived at the point b from the point a is transmitted in the direction of the point d, and is reflected at the point d has about ½ of the transient impedance by when it returns to the point o.

It is well known that when surge is transmitted, the characteristic impedance of the electric current path changes, i.e., when the electric current path branches, if the impedance as seen from the branch point is smaller than the characteristic impedance of the electric current path, the voltage reflection coefficient becomes negative, and the transient impedance is reduced.

Figure 15:
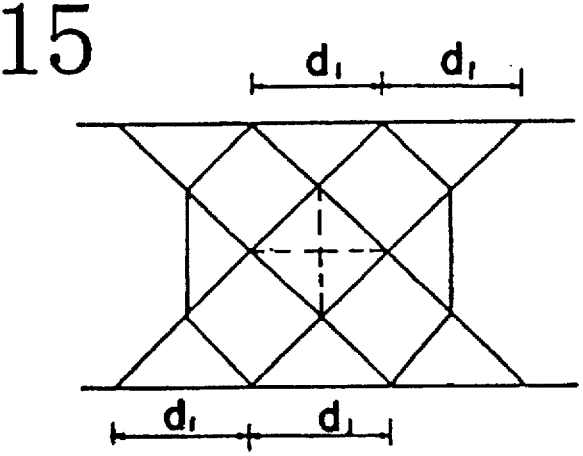
FIG. 15 is a variant example of the electric current path for theoretical explanation.
Figure 16:
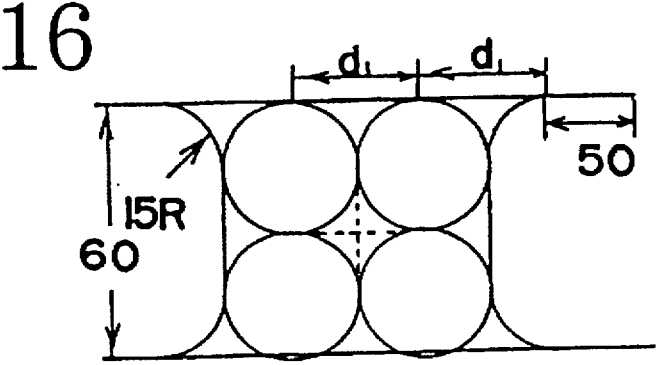
FIG. 16 is a variant example of the electric current path for theoretical explanation.

The transient impedance as seen from the point o of FIG. 9 is divided at the point a into the branch path ab and the branch path ac, and the voltage reflection coefficient becomes negative and is reduced to about ½. And also at the point b it is divided into the electric current path bd and the electric current path bc, and the transient impedance is again reduced. Surge is reflected at the point d and returns to the point b. Further, surge from the point c in the direction of the point b also arrives at the point b. The transient impedance is changed in a complicated manner due to the times of arrival of these surges. Due to the existence of the point b (the point c), it is possible to reduce the value $Z_{1m}$, of the transient impedance and the time transient impedance $d_1/d_2=$ 2. Moreover, FIG. 15 and FIG. 16 show the case when $d_2=0$. The units of the figures in FIG. 16 are centimeters, and one exemplary size is shown.

The portion shown in the figure by dotted lines is not required.

Here, since the period T for the electric current path oa=4×the length of the electric current path oa/the speed of the current (the reciprocal of the resonant frequency), the transient impedance is further reduced when the branch path ab and the branch path ac are circular arcs, as shown in FIG. 16, as compared to when they are straight lines.

Table 1 shows, for a variety of electrode models, a comparison of impedance between straight line arrangement and perpendicular arrangement, as obtained by experiment.

TABLE 1

| ELECTRODE | (units: cm) | PERPENDICULAR ARRANGEMENT | STRAIGHT LINE ARRANGEMENT |
|---|---|---|---|
| STRAIGHT ELECTRODE | | 193Ω | |
| T SHAPE ELECTRODE | 136.5 / 100 / 100 | 90Ω | 95Ω |
| Y SHAPE ELECTRODE | 136.5 / 50R | 95Ω | 90Ω |

TABLE 1-continued

| ELECTRODE | (units: cm) | PERPENDICULAR ARRANGEMENT | STRAIGHT LINE ARRANGEMENT |
|---|---|---|---|
| CURVED LINE BRANCH T SHAPE (RADIUS 25) | 136.5, 25R, 100, 100 | 90Ω | 90Ω |
| CURVED LINE BRANCH T SHAPE (RADIUS 50) | 136.5, 50R, 100, 100 | 52Ω | 59Ω |
| COMBINATON Y & T CONFIGURATION | 136.5, 50R, 100, 100 | 59Ω | 50Ω |

Figure 17:
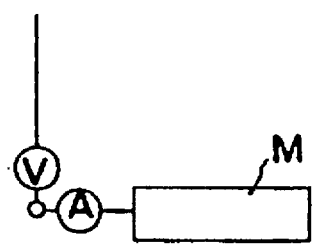
FIG. 17 is an example of arrangement of an electrode model in opposition to the electric current path, for theoretical explanation.
Figure 18:
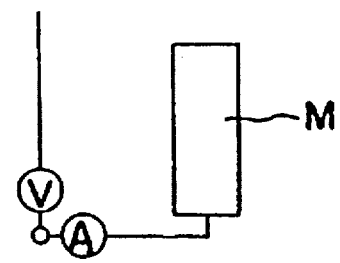
FIG. 18 is an example of arrangement of an electrode model in opposition to the electric current path, for theoretical explanation.

Moreover, by "straight line arrangement" it is meant that the electrode model M is arranged in a straight line orientation with respect to the electric current path, as shown in FIG. 17. In contrast to this, by "perpendicular arrangement" it is meant that the electrode model M is arranged in a perpendicular orientation with respect to the electric current path, as shown in FIG. 18.

Further, returning to FIG. 9 so as to continue the explanation, when bc are linked together, a branch current is given rise to at the point b in the direction of the point c, and until its reflection returns from the point d the transient impedance is further reduced.

However, when $d_2$ becomes greater than $2d_1$, the transient impedance of $d_2$ appears more than by the effect of the link bc, and the transient impedance is further reduced.

Further, if there is a branch current to another conductor at the terminal end d, then reduction of the transient impedance can be anticipated.

Accordingly, the transient impedance of a conductor formation such as described above, as is seen from the figures, is further reduced as far as about ¼ by the provision of a connecting link bc.

Further, at this time, it is necessary to ensure that for each side $d_1/d_2=2$.

Now a comparison will be made between an arc shaped branch connecting link and a straight branch connecting link.

Figure 19:
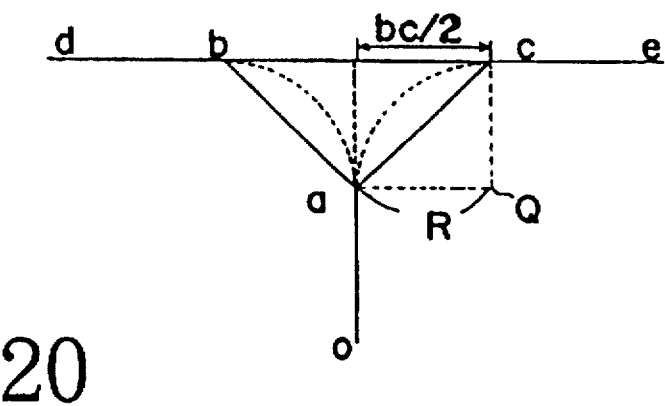
FIG. 19 is an explanatory figure for theoretical explanation, showing a branchelectric current path which is formed as rectilinear.
Figure 20:
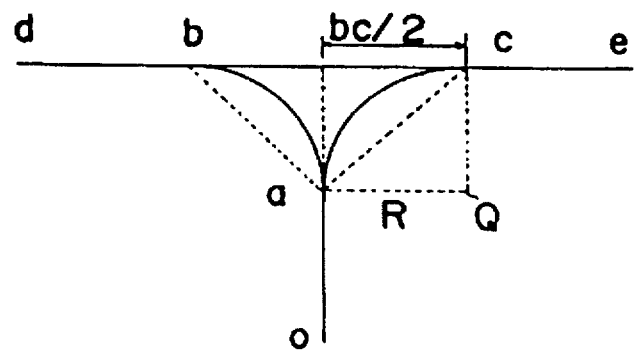
FIG. 20 is an explanatory figure for theoretical explanation, showing a branch electric current path which is formed in a circular arc shape.

If the wiring arrangements shown in FIG. 19 and FIG. 20 are set up, and exhibit completely electrically equivalent inherent resistance values, and moreover exhibit equivalent characteristic impedances, then, when distance comparison for each of these arrangements is performed, the following results are obtained. Suppose that ce=db=ad=R. Further, suppose that R=1 as a comparison. Moreover, suppose that input is performed from the point o. Q is the center of the arc.

With the straight line branch T shape:

$(ac)^2=R^2+R^2=2R^2$ $ac=(2R^2)^{1/2}=2^{1/2}R$

Here, if R is taken as 1, then $ac=2^{1/2}=1.41$

With the curved branch T shape:

If it is assumed that $ac=2\pi R/4=AC$, then, if R is 1, $AC=\pi/2=1.57$

Accordingly, $AC/ac=(2\pi R/4)/(2R^2)^{1/2}=\pi R/2\times 2^{1/2}R=\pi/2$ $2^{1/2}=1.11$ In this manner, if the straight line branch T shape is taken as 1, then the curved line branch T shape has a greater time than 1 (about 1.11 times).

The presumptive theory for this phenomenon is as described above, and the present experimental values are its basis. The greatest cause is considered to be superposition of the reflected waves of the branch portions.

Here, when the velocity of progression of the pulse waves is taken to be constant, even for the curved line branch T shape, it has been measured that an almost equivalent reflection time is required, both when input is performed at the point o as described above and also when it is performed at the point e.

In this case, since the reflection time for input at the point b ($2\pi+8$=the reflection time for input at the point a ($2\pi+8$), therefore the time $t_1$ for reinsertion at the point a of the straight line T shape branch comes to $=8+4\times 2^{1-2}$; while, by contrast to this, for the curved line T shape branch, in the case that R=1, $t_2$ comes to $=2\pi+8$; and thus the time for the case of the curved line T shape branch is larger by 0.05.

Further, the time $t_3$ for reinsertion at the point b of the straight line T shape branch comes to $=8+4\times 2^{1/2}$.

By contrast to this, since with the curved line T shape branch $t_4$ comes to $=2\pi R+8$, therefore also in this case the time for the case of the curved line T shape branch is larger by 0.05.

Next, the fluctuation characteristics of the transient impedance for the branch point will be explained.

FIG. 10(a) shows experimental data when $d_1=2d_2$ in the FIG. 9 arrangement, FIG. 10(b) shows such data when $d_1<2d_2$, and FIG. 10(c) shows such data when there is no bc interval.

Further, FIGS. 13(a), (b), (c), and (d) are FIGS. 10(a), (b), and (c) when calculated for no loss: FIG. 13(a) is for $d_1/d_2=0.4$, FIG. 13(b) is for $d_1/d_2=1.3$, FIG. 13(c) is for $d_1/d_2=2$, and FIG. 13(d) is for $d_1/d_2=4$. Further, since for FIG. 13(d) K2 is only a little lower as compared to K1 in FIG. 13(c), it may be said that the case of $d_1/d_2=2$ is the best, i.e. that it is possible to provide the maximum efficiency with the minimum required limit of supplementation of the electric current path.

FIG. 12 is a combination of the FIG. 11 figures modeled after FIG. 10.

Figure 11A:
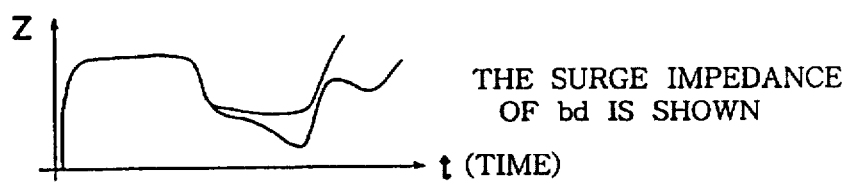
FIGS. 11(a), 11(b), 11(c) and 11(d) are graphs based upon FIG. 10, for theoretical explanation.
Figure 11B:
Figure 11C:
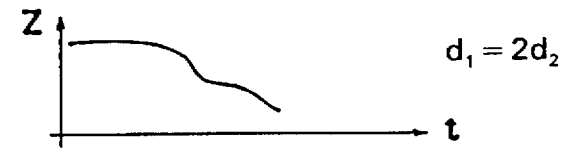
Figure 11D:
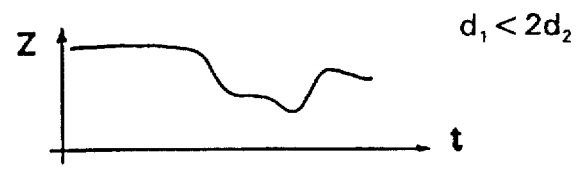
Figure 14:
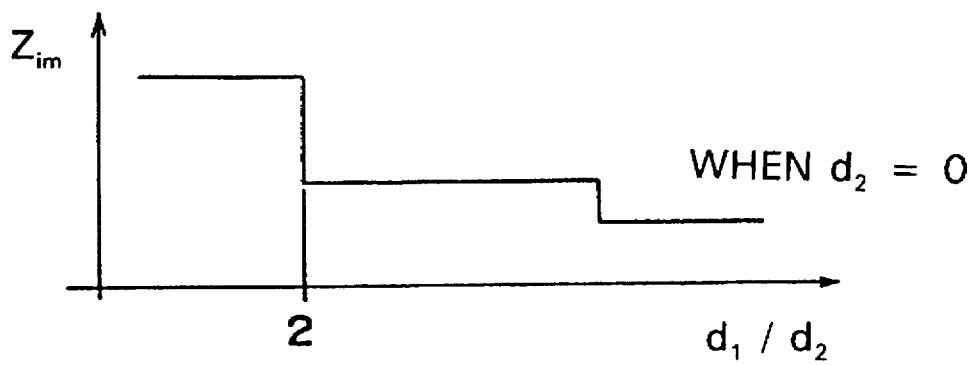
FIG. 14 is an explanatory figure showing the change of transient impedance due to the ratio of $d_1$ and $d_2$ in the basic construction, according to theory.

FIG. 11(a) is a graph showing the transient impedance between b and d. FIG. 11(b) is when there is no bc interval. FIG. 11(c) is when $d_1=2d_2$, and FIG. 11(d) is when $d_1<2d_2=4$. In FIG. 12, when $d_1=0$, the maximum value due to the transient impedance is determined as alpha α. Further, when the alpha×½ when $d_1$ becomes $=2d_2$, i.e. when $d_1/d_2=2$, is again exceeded, it is determined that the transient impedance of the same branch portion reaches the minimum value (about ¼). Again, when $d_1/d_2$ is exceeded, again the transient impedance of the same branch portion continues to be reduced to infinity. FIG. 14 shows schematically the change of the transient impedance with respect to the ratio of $d_1$ and $d_2$.

Further, as a result of considering a mesh as a group of branch points, the following kind of results have been confirmed as rules for the branch links. The explanation will be made using one branch point, for the purposes of explaining the principle. This is a rule of the transient impedance due to the relationship between the length of the branch point and the terminal end of the branch point.

Figure 21A:
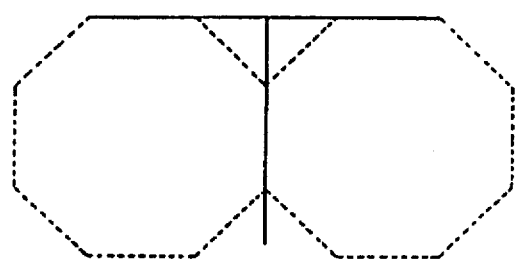
FIG. 21 is an explanatory figure for theoretical explanation, showing changes of a mesh branch electric current path.

FIG. 21(a) shows the case when $d_1=0$, and the maximum value of the transient impedance is shown.

Figure 21B:
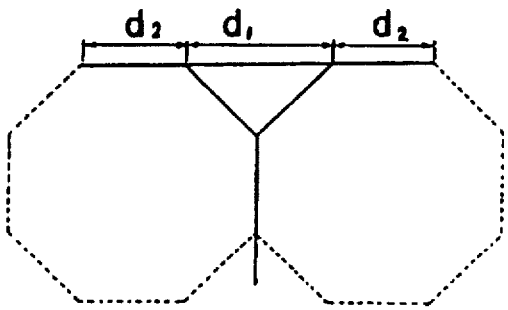
Figure 21C:
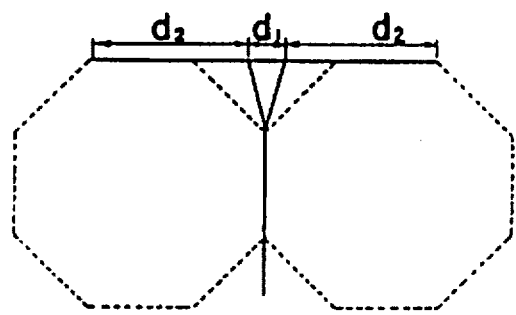

FIG. 21(b) shows the case when $d_1<2\times d_2$, and along with going to the branch the transient impedance of the same portion becomes minimum. If the previously described portion bc exists, the portion $d_1$ is further reduced as far as ¼. If the portion $d_1$ does not exist, this minimum value does not get past stopping at about ½ of $d_1=0$.

Figure 21D:
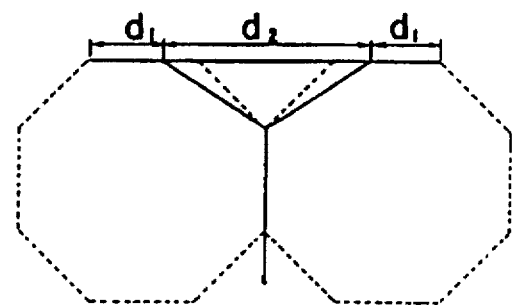

FIG. 21(d) shows the case when $d_1>2\times d_2$, and the transient impedance of the value when the same part continues to decrease as far as infinity.

Further, when the same repeated construction is present, when $d_2=0$, yet further less than the transient impedance for $d_1/d_2=2$ is obtained. A solid body is a good example of a repeated construction. The previously described matters are rules for transient impedance for traveling waves considered as reflective waves, for which results are obtained for various branch point formats used as objects of experiment.

In the above described experiments, with $d_1$ equal to 100 and $d_2$ equal to 50, the length of the perpendicular line from a dropped to the midpoint of $d_1$ is 50. Further, the proportion $d_1:d_2:d_1$ becomes 1:2:1, and accordingly the proportion of ac becomes $2^{1/2}$.

If the fact that reflection is generated at the terminal ends is considered here, this relation can be transferred to the case of a solid body.

In this case, the terminal ends are points at which the reflected waves are generated, and are points where the transient impedance is different. This is due to the consideration of current division.

Figure 22:
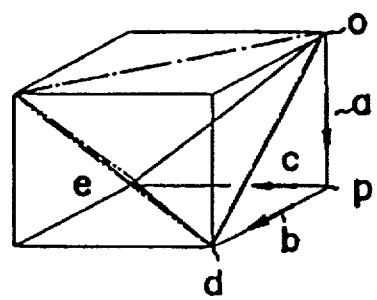
FIG. 22 is an explanatory figure for theoretical explanation, showing a surge of a branch electrical current.

In other words, a surge which is input from o is divided at a, and as a result thereof the relationship between the outputs $d_1$ and $d_2$ is set to b-c to show the minimum value, and moreover if it is assumed that $d_1=2d_2$ then it will be understood that it becomes the minimum transient impedance. Further, if solid body divided currents as those of FIG. 22 are considered, the positions which correspond to the previously described lowercase alphabet letters become as in the same figure. In this case the current division of the surge which is input from o is at a, and the rule for reduction of the transient impedance for the input point o which comes to be current separated at b and c must be determined as the position corresponding to b-c here, since it will be understood that it is possible to obtain the minimum transient impedance if as described above it is assumed that $d_1=2d_2$.

Since at this time e and d are the ones which correspond to the above described terminal ends, it is necessary to determine whether or not c and b are where the two sides of p-d and p-e must be positioned.

Figure 23A:
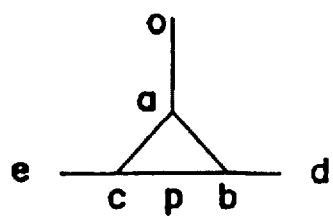
FIGS. 23(a) and 23(b) are explanatory figures for theoretical explanation, showing the theoretical form of the electric current path and its apparent form.
Figure 23B:
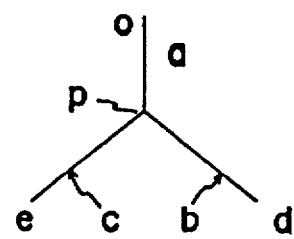

However, here, when it is considered that the ratios pinched by each of the terminal ends were $d_1:d_2:d_1=1:2:1$, when the arrangement of the same portions is replaced by a plane, then it becomes like FIGS. 23(a) and (b). FIG. 23(a) shows the theoretical form, while FIG. 23(b) shows the apparent form.

However, since at this time the point p is simultaneously another vertex, and since therefore the current division point a must be obtained between op, accordingly c and b come to be obtained as the midpoints of the sides. At this time, the ratio of ab to ac comes to be $2^{1/2}$, so that the above conditions are satisfied. The positions of the various points are different according to theory and in appearance, as shown in FIG. 23.

Figure 24:
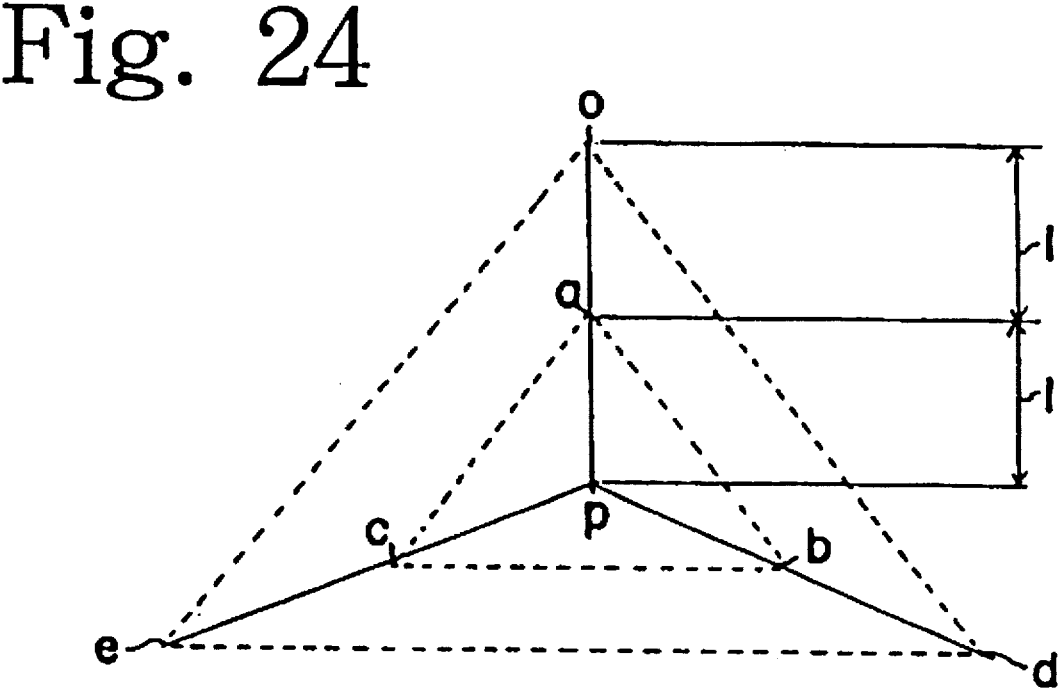
FIG. 24 is an explanatory figure for theoretical explanation, showing the positional relationships of the vertex p of FIG. 22 as seen from the inside or from the outside thereof.

FIG. 24 shows the positional relationships for the vertex p of FIG. 23, as seen from inside or from outside. Here, oa:ap=ec:cp=db:bp=1:1.

Figure 1:
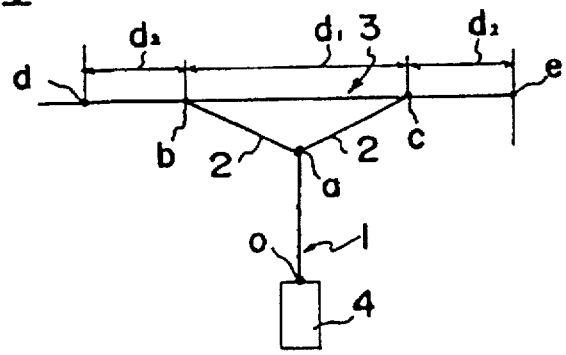
FIG. 1 is an explanatory figure showing a wiring structure according to the first embodiment.

FIG. 1 shows the wiring structure of the first embodiment.

Referring to the figure, the reference numeral 1 denotes a first (primary side) electric current path, 2 is a branch electric current path, and 3 is a second (secondary side) electric current path; and o is a surge input point, a is a branch point, b and c are connection points, and d and e are terminal end points. Further, 4 is a device which is connected to said wiring structure.

In the figure, $d_2$ is the distance between b and d, and $d_1$ is the distance between b and c; and the relationship $d_1=2d_2$ holds. In this case, basically the point o is the input point, but it is also possible to make one or the other of the terminal end points d and e the input point. This wiring structure can be suitably applied to a grounding line, an electric motor, a transformer, an isolation device, a noise filter, an antenna, a circuit base board, an accumulation circuit, or the like.

Further, this wiring structure may also be covered with an inductive coating.

In this case, because the density of electrical flux increases since the inductive coating is all around it, the voltage and current transmission loss is reduced and the reduction of the transient impedance greatly benefits.

Figure 2:
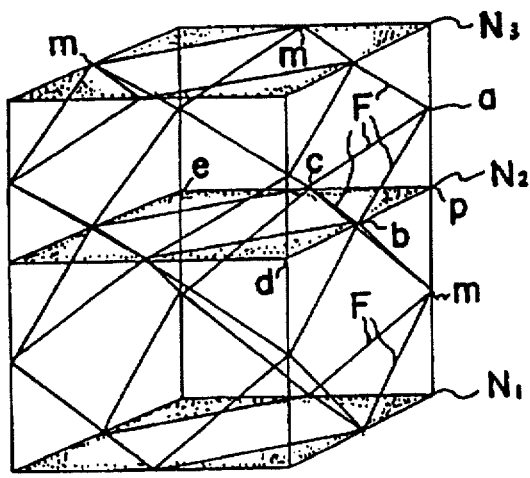
FIG. 2 is an explanatory figure showing a wiring structure according to the second embodiment.

FIG. 2 shows a wiring structure of the second embodiment constructed according to the same characteristic impedance electric current path. Referring to this figure, the solid lines show the current path. Moreover, the thick lines show the current path which is newly set in this embodiment. In the figure, m is an intermediate point.

Here, the equation for the characteristic impedance is known to be, for example, the equation $Z_o=60 \times 1_{og}(2h+a)$. Further, the thicker is the electric current path is, the lower is the impedance. With the thickness of this electric current path being taken as the same, it is known that, the greater is the horizontal cross section for the size of a solid body, the lower is the transient impedance.

Further, in the case of a high structure like a rectangular parallelepiped with n=2 layers as in the figure, if branching as described above is performed for each of the branch sides, according to the above described principle, in the position that it becomes $d_1/d_2=2$, i.e. so as to link the ½ midpoints of each of the sides, then the shield earth wire Nn of each layer is further below the minimum value which is the value of about ½ of the value alpha of the transient impedance (the transient impedance) possessed by the original rectangular parallelepiped, and can be reduced to a transient impedance below about ¼ thereof.

Apart from this, if the effect of current division is added in even further other levels, further reduction is possible.

The gist of a branch is that it obtains the midpoint of each side, and provides the points F which link them together. The same thing can be performed in the same manner with a different layer. However, $N_1$, $N_2$, $N_3$ and the branch points connect the sides with straight lines. This is an extremely effective method for reduction of the transient impedance, especially for multi layer type high structures.

Accordingly, when comparing with groups of objects in which the above described connecting lines are not made, at least for the $N_1$ layer it becomes about ½×½×½=⅛. Further, if the result of superposing the reflected waves is set, suitably while taking into consideration the electromagnetic field, as compared to the case in which the above connecting lines are not made, a reduction to about ¼ is possible.

Accordingly, in the case of an n layer high structure, in comparison with a wiring arrangement of a group of objects, at least the transient impedance of the sheltered grounding wire of the uppermost layer becomes $½^{(n+1)}$.

Moreover, in this case, the connections between the layers can be made in circular arc form instead of straight line form.

Figure 3:
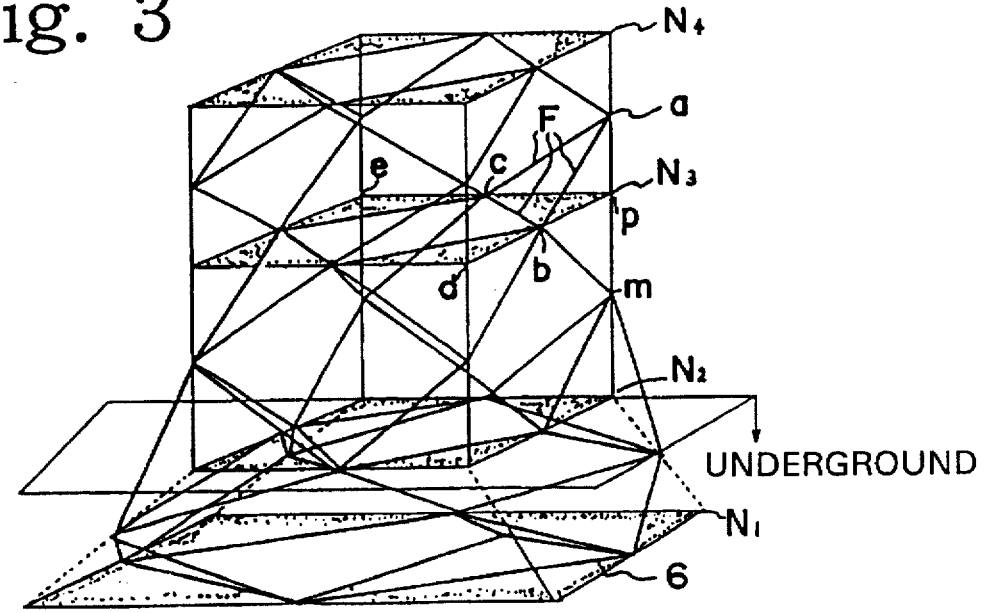
FIG. 3 is an explanatory figure showing a wiring structure according to the third embodiment.

FIG. 3 shows the wiring structure of the third embodiment; if as shown in the figure there is an underground substructure, and if the lowermost layer is termed the lying underground grounding wire 6, then the higher ranking lying underground layers and the connecting means, as shown in the figure, can use the present method of tying together the same ½ points.

Although the differences in impedance induce efficacy of reflection, at this time, the voltage reflection coefficient is given by $\gamma=(Z_1-Z_0)/(Z_1+Z_0)$.

However, $Z_1$ is the impedance of a separate electric current path seen from the point where the load is located, $Z_0$ is the characteristic impedance (the current flow path inherent wave motion impedance), and $\gamma$ is the voltage reflection coefficient.

When at the terminal ends $Z_1=\infty$, then $\gamma$ becomes −1, and accordingly a negative voltage returns. A reflection is generated when $Z_1 \neq Z_0$. At this time, the final ends of the electric current path can be considered as infinitely large. At the final ends (open ends)$Z_1=\infty$, and at the sides where $Z_1=0$, i.e. at the portions which are connected to earth (the shorted ends), there are so called alias same names.

Figure 4:
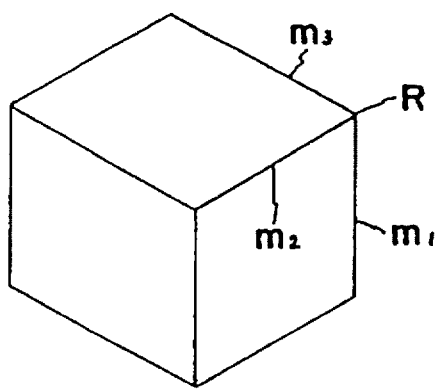
FIG. 4 is an explanatory figure showing a vertex defined by three sides of the third embodiment.

In the case of a solid body such as shown in FIG. 4, the vertex R is formed by three sides, and each side has two terminal ends. For example, the side m1 can be considered as having two terminal ends, an upper and a lower one. And the vertex R is a common terminal end for the three sides m1, m2, and m3.

Figure 5:
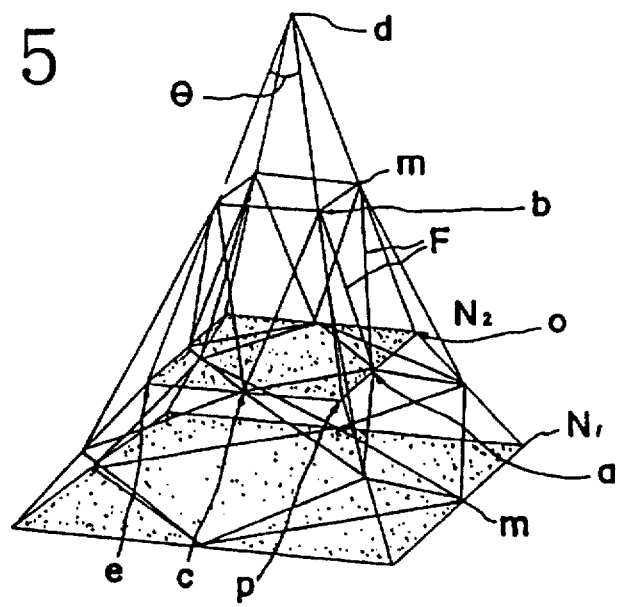
FIG. 5 is an explanatory figure showing a wiring structure according to the fourth embodiment.

FIG. 5 shows the wiring structure of the fourth embodiment. If this wiring structure is replaced by a solid body according to the present theory, it is not possible to anticipate much efficacy as an anti lightning spire, but the shielding efficiency for inside the building is elevated.

It is known that there is a tendency for the impedance to be higher for a tapered configuration for a solid body. On the other hand, it is known that there is a tendency for the surface impedance to become lower if the shape is such that the vertex is completely surrounded by obtuse angles. In this case, it is known that the equation for the impedance as seen from the vertex is $60 \times 1_{og}(\cos\theta/2)$, and it is also known that even with a four cornered pyramid or a three cornered pyramid the above described equation is approximately applicable.

Further, if each layer spreads out as shown in the figure, and further if, even in the case of a high construction which gets narrower, the connecting lines are each set to ½ of each side in the same manner, then it is possible to ensure a transient impedance of less than approximately ½ of what it was before setting. Between $N_1$ and $N_2$ there is a connection, as shown in the figure by a straight line.

However, it is necessary to consider the influence of the electromagnetic field as the construction becomes more complicated. Accordingly, if the influence of the electromagnetic field is considered, an extremely good result can be anticipated.

Further, in this case, since a construction with arc shaped connections is one which has advantageous possibilities, it can be much utilized. Further, since it is known that in the case of bending the electric current path through a right angle the frequency becomes greater, as compared with the case of the emitted electromagnetic field being brought around an arc shape connection, thereby it is considered that the transient impedance becomes lower in the case of the arc shape connection, for example in the event of successive flashes of lightening or high frequency waves.

Figure 6:
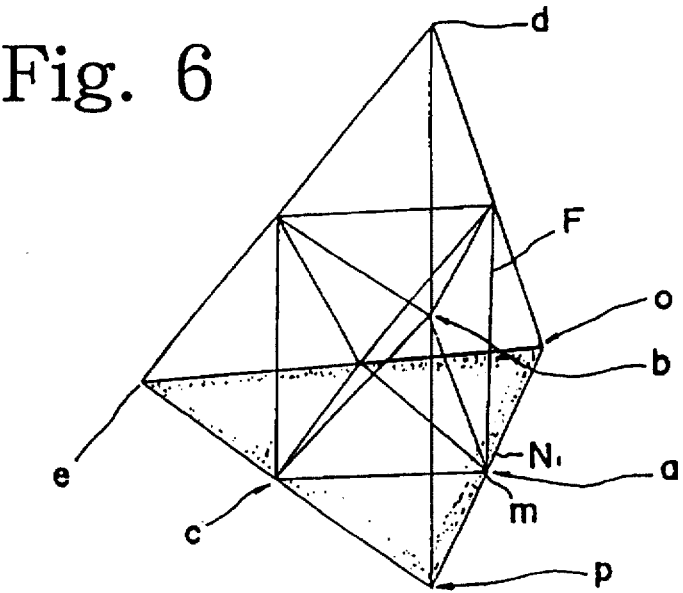
FIG. 6 is an explanatory figure showing a wiring structure according to the fifth embodiment.

FIG. 6 shows the wiring structure of the fifth embodiment; also in the case of a high construction in the form of a three sided pyramid as shown in the figure (for example, a steel tower), when branch points F are provided with each point connected together by half of each of the sides, then (a transient impedance) can be obtained of at least about ½ of the minimum value of what it would be if no such provision were made; and, if the conformity of the electric field is considered, it is possible to ensure a transient impedance of about ¼. In this case, it is also possible to consider the summit as the terminal end d.

Figure 7:
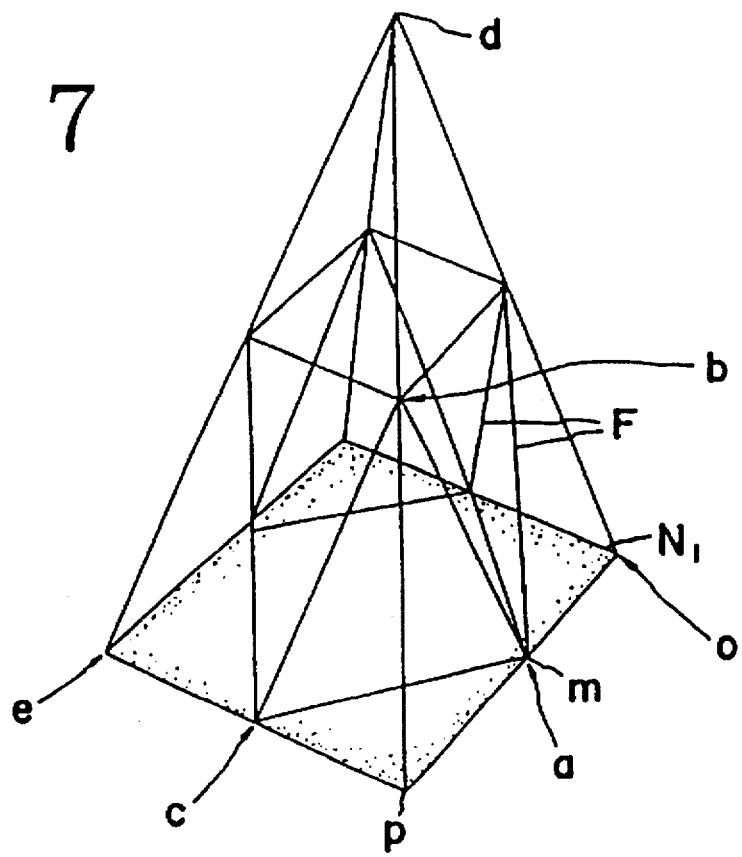
FIG. 7 is an explanatory figure showing a wiring structure according to the sixth embodiment.

FIG. 7 shows the wiring structure of the sixth embodiment, of which the bottom face is a rectangle. In this case as well, it is also possible to consider the summit as the terminal end d.

Figure 8:
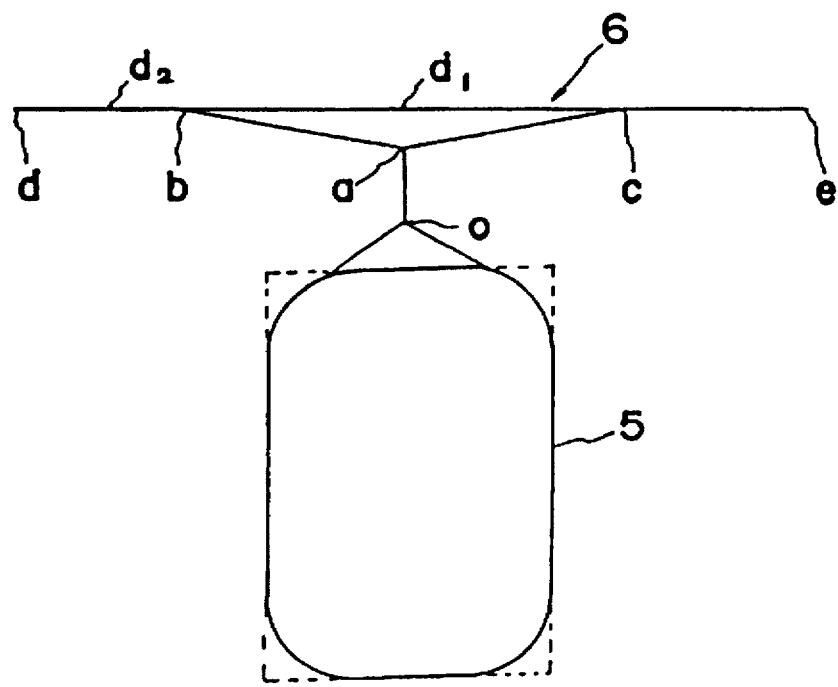
FIG. 8 is an explanatory figure showing a wiring structure according to the seventh embodiment.

FIG. 8 shows the wiring structure of the seventh embodiment; and, although in the figure there is shown the case in which a long buried underground grounding wire 6 (a so called counterpoise) is provided to the mesh 5, also in this case, the point b is obtained so that the interval between the terminal ends becomes $d_1=2d_2$, and if this point and its corresponding branch point are joined, it is possible to ensure a transient impedance which is less than about ¼ of the transient impedance in the case that the branch point is not set according to the principles of this invention.

As described above, the wiring structure with reduced transient impedance according to the present invention can be utilized for reduction of transient impedance in grounding wiring structures which are influenced by transient impedance, in electric motors, transformers, isolation devices, noise filters, antennas, circuit base boards, accumulation circuits and the like.

The embodiments of the invention in which an exclusive property or privilege is claimed are defined as follows:

1. A wiring structure having reduced transient impedance, comprising:
    a first electric current path comprising a surge input point and a branch point on a reflected current side of said first electric current path relative to said surge input point;
    a second electric current path comprising two terminal end points at which reflected waves due to surge are generated and two connection points positioned each at a same distance from respective said terminal end points; and
    branch electric current paths having substantially the same length connecting said branch point to respective said connection points.

2. A wiring structure having reduced transient impedance comprising:
    a first electric current path comprising a surge input point and a branch point on a reflected current side of said first electric current path relative to said surge input point;
    a second electric current path comprising two terminal end points at which reflected waves due to surge are generated and two connection points positioned each at a same distance from respective said terminal end points;
    branch electric current paths having substantially the same length connecting said branch point to respective said connection points; and
    a first distance between the connection points being twice a second distance between respective connection points and said terminal end points when impedances of said electric current paths are calculated without loss.

3. A wiring structure having reduced transient impedance comprising:
    a first electric current path comprising a surge input point and a branch point on a reflected current side of said first electric current path relative to said surge input point;
    a second electric current path comprising two terminal end points at which reflected waves due to surge are generated and two connection points positioned each at a same distance from respective said terminal end points;
    branch electric current paths having substantially the same length connecting said branch point to respective said connection points; and
    said branch electric current paths which connect the branch point to the connection points of the second electric current path being formed in arc shapes.

4. A wiring structure having reduced transient impedance, comprising:
    a first electric current path including a first terminal end and a branching end;
    a second electric current path including second and third terminal ends, and first and second connection points located between said second and third terminal ends, a first segment of said second electrical current path between said second terminal end and said first connection point being equal in length to a second segment of said second electrical current path between said third terminal end and said second connection point, one of said second and third terminals being a surge input point; and
    first and second branch electric current paths connect said branching end respectively to said first and second connecting points, said first and second branch electric current paths having generally the same length.

5. The wiring structure according to claim 4, wherein a third segment of said second electrical current path between said first and second connecting points has a length generally twice the length of said first and second segments.

6. The wiring structure according to claim 4, wherein said first and second branch electric current paths have an arc shape to further reduce transient impedance.

7. A wiring structure having reduced transient impedance, comprising:
    a first current path including a terminal point and a branch point;
    a second current path including first and second terminal ends and first and second connecting points located between said first and second terminal ends on said second current path, said first and second connecting points being positioned at a same distance from said first and second terminal ends respectively;
    a first branch being connected between said first connecting point and said branch point;
    a second branch being connected between said second connecting point and said branch point; and
    one of said terminal point, first terminal end and said second terminal end acting as a surge input point receiving a surge current waveform;
    whereby surge current being divided at said branch point and said first and second connecting points, a voltage reflection coefficient at each point being negative, and arrival times of reflected surge currents at each point being different such that transient impedance is reduced.

8. The wiring structure according to claim 7, wherein said first and second branches are generally equal in length.

9. The wiring structure according to claim 8, wherein a first distance between said first and second connecting points is twice as long as a second distance between said first connecting point and said first terminal end.

10. The wiring structure according to claim 9, wherein said first and second branches have an arcuate shape to further reduce transient impedance.

* * * * *

UNITED STATES PATENT AND TRADEMARK OFFICE
CERTIFICATE OF CORRECTION

PATENT NO. : 5 721 660
DATED : February 24, 1998
INVENTOR(S) : Kunitaka MIZOBE, et al.

It is certified that error appears in the above-indentified patent and that said Letters Patent is hereby corrected as shown below:

On the title page, item [76], line 4
       after "Kawagoe-shi," insert ---Saitama---.

Signed and Sealed this

Fifteenth Day of December, 1998

Attest:

BRUCE LEHMAN

Attesting Officer    Commissioner of Patents and Trademarks